Sept. 23, 1941.   D. A. BATTISTE   2,256,936
DOUGHMAKING PROCESS
Original Filed Sept. 5, 1940
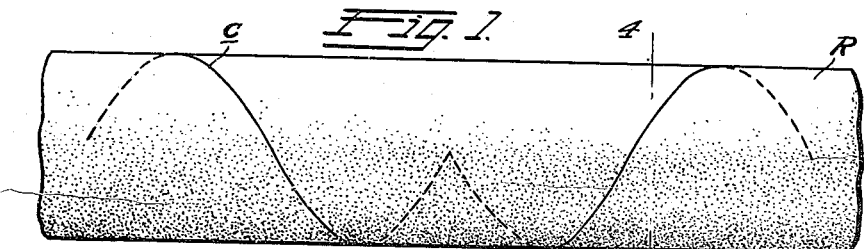
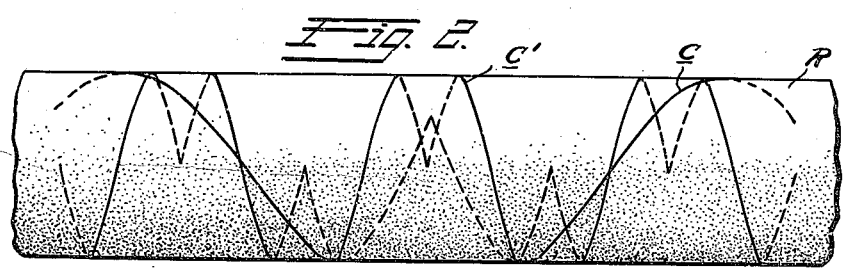
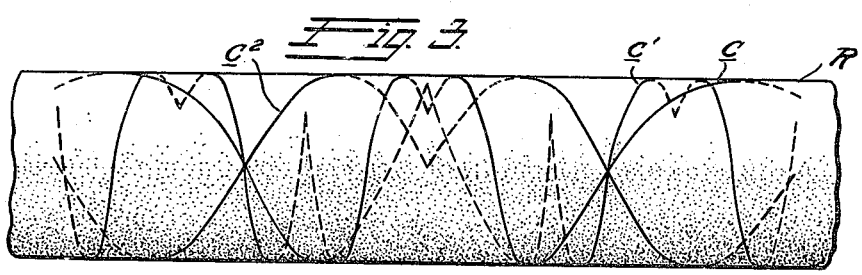
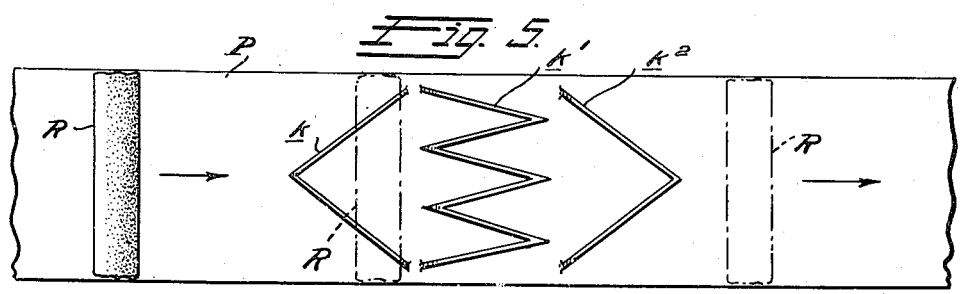
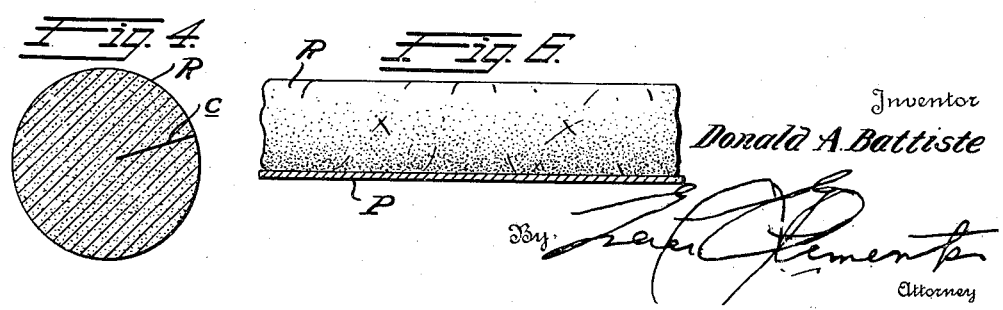
Inventor
Donald A. Battiste
By
Attorney Patented Sept. 23, 1941

2,256,936

UNITED STATES PATENT OFFICE 2,256,936

DOUGHMAKING PROCESS

Donald A. Battiste, Yeadon, Pa.

Original application September 5, 1940, Serial No. 355,536. Divided and this application May 21, 1941, Serial No. 394,550

7 Claims. (Cl. 107—54)

This invention relates to a method of treating dough, and is a division of my co-pending application, Ser. No. 355,536, filed September 5, 1940. More specifically the invention is concerned with a method of treating or processing dough in the manufacture of bread or other similar dough product.

In the art of manufacturing bread or like dough products, and particularly in the quantity production thereof, it is the common practice to subject successive uniform masses of dough to a rolling action for providing uniform texture or consistency throughout such masses of dough.

While this method of dough treatment in the manufacture of bread and like products has proven measurably successful, it nevertheless presents a major objection as is evidenced by complaints from purchasers of such dough products. This objection is the presence of large gas-produced voids or cells which in some instances are numerous and which not only mar the appearance and lasting qualities of the sliced bread, or other dough products, but also objectionably affect the texture and flavor of the product.

In the baking art, porosity and lightness is imparted to the loaf by the formation of pockets or cells from gas released as a result of the bacterial action of yeast. While the presence of the gas pockets is necessary and desirable, it is also essential and desirable that they be restricted in size and shape as well as to have them uniformly distributed, as a bread of superior texture and flavor is obtained when these gas pockets are extremely small in size, numerous, and uniformly spaced throughout the mass of the loaf, so as to be in the form of long shreads rather than round or pin head cells.

This objection has occupied the attention of commercial bakers for some time and in an attempt to overcome same, various methods of dough treatment have been proposed, but none appear to have successfully overcome the objections above referred to particularly in the quantity production of dough products.

Among the many attempts to avoid these large gas pockets in loaves of bread is the proposed method of piercing the raised dough immediately prior to baking throughout substantially the entire horizontal area and depth of the loaf for permitting escape of entrained gas to the atmosphere.

This method however presents a serious objection in that the skin of the finally rolled dough is pierced or ruptured and will not completely seal during the baking operation, thereby presenting an irregular and accordingly unsightly crust on the baked product.

It has further been proposed in attempts to produce long shread instead of round or pin head cells to divide a dough loaf transversely of the longitudinal axis thereof into several sections and arrange the sections in such positions for baking that the positions of the original loaf are parallel to each other, in other words, transverse to the position they would normally occupy were the whole loaf placed for baking as a unit.

While in this method the original mass of dough is divided, the entire mass of the dough is not so treated as to assure the release of gas from all large air cells and consequently a baked product having a uniform texture is not assured.

A further step toward solution of this problem has been the method of producing pan bread in the form of an elongated loaf consisting of forming a plurality of slender rolls of dough twisted around each other whereby the round or pin head gas pockets or cells were avoided by substantial elongation of the cells which became correspondingly smaller in transverse section to produce long shread texture.

While in accordance with methods employing twisting steps, a bread loaf devoid of round cells or pockets may be produced by several hand operations, nevertheless the cells will not be uniform in shape and size or uniformly distributed throughout the mass of dough which is a highly important consideration in the commercial production of bread or like baked products. It has been found that such uniformity in size, shape and distribution of the cells is necessary in order to provide a tender crumb which is readily masticated, without that sensation of doughiness when eaten, which is experienced when the bread is produced by methods employing twisting as above explained.

In consideration of the above, a primary objection of this invention is the provision of a method for effectively eliminating the heretofore objectionable large as well as the round or pin head gas cells in loaves of bread and thereby providing a uniform long shread texture throughout the masses of the loaves.

A further object of the invention is the provision of an improved method in the treatment of dough for providing a substantially uniform long shread cellular texture in bread loaves which is effected during the rolling of the masses of dough preparatory to the formation of the loaves.

A still further object of the invention is the provision of a method of treating dough in the manufacture of bread loaves wherein successive masses of dough are provided with cuts during the rolling of such masses, preparatory to the formation of loaves for a further working and kneading of the mass resulting in the discharge of pocket entrapped gases from within the dough rolls and the elongation of cells to remain therein for the production of bread having an improved uniform texture, or consistency, and flavor.

A still further object of the invention is the provision of a method of treating dough wherein a mass of dough is subjected to a rolling action, to form a roll of dough, providing a spiral or circumferential cut in the roll of dough from end to end thereof during the rolling action, and continuing the rolling action thereafter until the cut is substantially obliterated for the production of an unbroken skin.

A still further object of the invention is the provision of a method for effectively venting rolls of dough in the manufacture of bread and for redistributing and shaping of the remaining gas cells for uniform consistency, texture and flavor, and wherein the skins of the rolls are unbroken when panned for baking thereby providing loaves of bread having smooth continuous crusts.

With the above and other objects in view, reference will be had to the accompanying drawing wherein is disclosed, more or less diagrammatically the successive steps involved in my improved method.

In the drawing:

Fig. 1 is a side elevational view of a roll of dough provided with a single cut extending circumferentially and longitudinally of the roll and which is formed during the step of rolling the dough with one knife cut.

Fig. 2 is a view similar to Fig. 1 but showing in addition thereto a second cut in intersecting relation to the first cut where two knives are used.

Fig. 3 is a view similar to Fig. 2 but showing in addition thereto a third cut in intersecting relation to the first and second cuts where three or more knives are used.

Fig. 4 is a transverse section on the line 4—4 in Fig. 1 to show the approximate depth of the cut.

Fig. 5 is a diagrammatic top plan view of one form of satisfactory means for carrying the improved method into effect, such as shown in Fig. 3.

Fig. 6 is a transverse sectional view corresponding in position to the right hand dotted roll in Fig. 5.

The improved method essentially comprises the step of rolling a measured mass of dough and which may be accomplished as in my above referred to co-pending application or by rolling the roll of dough R along a suitable plate P (Fig. 5) by any desired means in cooperation with the plate P.

The rolling operation in common with that heretofore in use is for the purpose of removing surplus gas and obtaining, so far as possible, a uniform consistency of the mass of dough. This rolling action in itself however does not provide a satisfactory texture or uniform mass consistency for reasons above set forth and accordingly my improved method comprises the additional step of providing a circumferential cut or cuts in the roll during the rolling operation in order to penetrate undesirably large pockets for release of gas therefrom during the rolling operation and the subsequent dimensional reduction of the pockets and the elongation of the remaining cells.

While such cut or cuts may be provided by any suitable means, it is advantageous as well as practicable from the standpoint of time economy to provide a knife or knives on the rolling plate P whereby the cut or cuts are automatically provided during the rolling of the dough lengthwise of the plate. A desirable arrangement of knives K, K' and K² is illustrated in Fig. 5. These knives may be suitably secured to the plate P and are of such height as to provide a cut extending well toward the longitudinal axis of the dough roll as is indicated in Fig. 4.

As indicated, knives K and K² are each of V-form in plan but with their apices oppositely and outwardly directed, and the intermediate knife K' is in the form of three V's but may be in the form of a W. In fact the form of the knives in plan view may be substantially varied within the scope of this invention, it being desirable only that when the successive knives are used that they will provide cuts in the rolls R which intersect each other. The dimensions of a knife or knives lengthwise of plate P are preferably equal to the circumference of the rolls and while the knives are shown slightly spaced longitudinally of the plate, they may be spaced a distance equal to the circumference of a roll and while three knives are disclosed the method may be practiced with only one or two of such knives.

In the practice of my improved method, elongated masses of dough in the form of rolls R are rolled, preferably under pressure contact, lengthwise of the plate P in the direction of the arrows. Upon moving over the knife K the roll R will be provided with a circumferential cut $c$ (Fig. 1) extending substantially from end to end of the roll. Upon moving over the second knife K' the roll will be provided with a second cut C' (Fig. 2) which also extends circumferentially of the roll and throughout substantially the length thereof and which at points intersects the first cut $c$.

Upon moving over the third knife K² the roll R will be provided with a third cut $c^2$ (Fig. 3) which at points intersects the cuts $c$ and $c_2$.

As indicated by dot-and-dash lines in Fig. 5 the dough roll R continues in its rolling action after having been provided with the cuts and the rolling action is continued until the cut or cuts are substantially closed or obliterated, as is indicated in Fig. 6, by the further rolling which stretches, kneads and redistributes the dough of the mass and its contained gas pockets in producing an improved long shread texture.

The purpose of the cuts is to intersect objectionably large gas pockets or cells in the rolls of dough for venting same to the atmosphere and by the provision of the spiral cuts, a somewhat bellows-like action of the walls of the cuts follows during rolling movement of the rolls which results in the expulsion of gases from any large gas cells intercepted by the cuts as well as cells adjacent thereto.

It is to be particularly noted that by the provision of spiral cuts, the walls thereof will progressively open and close throughout the lengths of the cuts whereby danger of tearing the roll apart is avoided, if, for example, the cuts extended longitudinally and transversely of the roll.

The provision of the cuts not only provide for the effective discharge of gas from large pockets intercepted thereby but also provide for a further kneading action as affected by the several sections of the roll thereby substantially augmenting the expulsion of gases and providing a dough mass of uniform cell consistency throughout. By the provision of such roll of dough a uniform heat conductivity is presented throughout its mass whereby the roll will be baked uniformly throughout with a resulting loaf having definitely tender crumb and crust and which may be more readily masticated without the sensation of doughiness in the mouth of the consumer.

While the improved method may include only a single spiral cut $c$, $c'$ or $c^2$, it is preferable to provide at least two thereof whereby they will intersect at points for more effective release of pocketed gases as well as a more effective kneading action on the dough during the rolling thereof.

It is to be particularly noted that while the cuts may be provided by any means, they are preferably formed during the rolling action as disclosed which not only economizes in time but provides a more efficient kneading action and release of pocketed gases and by continued rolling after the provision of the cuts, same are substantially closed or obliterated prior to the formation of the loaves whereby a smooth and uninterrupted crust will result in the baked loaves of bread.

While I have disclosed my invention in accordance with a preferred embodiment thereof, such is to be considered as illustrative only, and not restrictive, the scope of the invention being defined in the sub-joined claims.

I claim:

1. A method of treating dough for bread making to improve the texture thereof by removing accumulation of gas therein comprising, the step of rolling an elongated mass of dough, providing a cut substantially half way through said mass and substantially from end to end of said elongated mass, and continuing the rolling thereof until inner cut portions of said mass are distributed over surface portions thereof to provide a continuous skin surface therefor.

2. A method of treating dough for bread making to improve the texture thereof by removing accumulation of gas therein comprising, the step of rolling an elongated mass of dough, providing a cut substantially from end to end of said elongated mass during the rolling thereof, and continuing said rolling step until the cut is substantially obliterated.

3. A method of treating dough for bread making to improve the texture thereof by removing accumulation of gas therein comprising, the step of rolling an elongated mass of dough, providing cuts in said elongated mass which intersect at points longitudinally thereof, and continuing said rolling step until said cuts are substantially obliterated.

4. A method of treating dough for bread making to improve the texture thereof by removing accumulation of gas therein comprising, the step of rolling an elongated mass of dough, providing a circumferential cut substantially from end to end of said elongated mass, and continuing said rolling step until the cut is substantially obliterated.

5. A method of treating dough for bread making to improve the texture thereof by removing accumulation of gas therein comprising, the step of rolling an elongated mass of dough, providing intersecting circumferential cuts substantially from end to end of said elongated mass during the rolling thereof, and continuing said rolling step until said cuts are substantially obliterated.

6. A method of treating dough for bread making to improve the texture thereof comprising the step of rolling an elongated mass of dough providing successive series of intersecting cuts in said elongated mass, and continuing said rolling step until said cuts are substantially obliterated.

7. A method of treating dough for bread making to improve the texture thereof comprising the step of rolling an elongated mass of dough, providing successive series of angularly related cuts in said elongated mass during the rolling thereof with the cuts of successive series thereof intersecting, and continuing said rolling step to produce a kneading action within the mass and flow of dough adjacent the cuts.

DONALD A. BATTISTE.